United States Patent [19]
Soroushian et al.

[11] Patent Number: 5,744,078
[45] Date of Patent: Apr. 28, 1998

[54] ACCELERATED PROCESSING OF CEMENT-BONDED PARTICLEBOARD AND FIBERBOARD

[75] Inventors: Parviz Soroushian, Ingham, Mich.; Khodabakhsh Ostovari, Orange, Calif.

[73] Assignee: DPD, Inc., Lansing, Mich.

[21] Appl. No.: 706,780

[22] Filed: Sep. 3, 1996

[51] Int. Cl.[6] .................................................. C04B 40/00
[52] U.S. Cl. ............................................. 264/82; 264/101
[58] Field of Search ................................. 264/82, 83, 101

[56] References Cited

U.S. PATENT DOCUMENTS

| | | | |
|---|---|---|---|
| 2,496,895 | 2/1950 | Staley. | |
| 3,149,986 | 9/1964 | Zelmanoff. | |
| 3,164,511 | 1/1965 | Elmenforf. | |
| 3,271,492 | 9/1966 | Elmendorf | 264/122 |
| 3,468,993 | 9/1969 | Bicrlich | 264/82 |
| 3,492,385 | 1/1970 | Simunic | 264/82 |
| 4,093,690 | 6/1978 | Murray | 264/82 |
| 4,266,921 | 5/1981 | Murray | 425/158 |
| 4,362,679 | 12/1982 | Malinowski | 264/82 |
| 4,393,019 | 7/1983 | Geimer | 264/83 |
| 4,427,610 | 1/1984 | Murray | 264/82 |
| 4,436,498 | 3/1984 | Murray | 425/73 |
| 4,517,147 | 5/1985 | Taylor et al. | 264/83 |
| 4,850,849 | 7/1989 | Hsu | 425/407 |
| 4,937,024 | 6/1990 | Hickson | 264/83 |
| 5,171,496 | 12/1992 | Hsu | 264/82 |
| 5,257,464 | 11/1993 | Trevino-Gonzales | 264/82 |

FOREIGN PATENT DOCUMENTS

| | | |
|---|---|---|
| 781328 | 3/1956 | United Kingdom. |
| 1460284 | 12/1976 | United Kingdom. |

Primary Examiner—Mary Lynn Theisen

[57] ABSTRACT

A method and an apparatus is provided for accelerated processing of cement-bonded particleboard or fiberboard under pressure through the injection of a diluted carbon dioxide gas. The method and apparatus yield controlled, thorough and efficient acceleration of the curing process, reduce the cost and raw material consumption in the process, broaden the raw materials basis for the production of cement-bonded particleboard and fiberboard, and yield end products with improved mechanical, physical and durability characteristics. Streamlined processing plants with improved productivity and efficiency can be based around this invention for the production of cement-bonded particleboards and fiberboards with improved performance characteristics.

6 Claims, 1 Drawing Sheet

Side View

Section 7-7

ACCELERATED PROCESSING OF CEMENT-BONDED PARTICLEBOARD AND FIBERBOARD

CROSS REFERENCES TO RELATED APPLICATIONS

None.

BACKGROUND

1. Field of Invention

This invention relates to building products, specifically to improved production of building panels.

2. Description of Prior Art

Cement-bonded particleboard and fiberboard present a synergic combination of inorganic binders (cement) with organic or inorganic particles and fibers. Natural (wood or plant) particles and fibers are commonly used in cement-bonded particleboard and fiberboard where cement provides a durable and stiff binder which protects natural particles and fibers against decay and fire; slender natural particles and fibers, on the other hand, reinforce the brittle inorganic matrix and enhance its toughness, machineability and tensile strength. Typical applications of cement-bonded particleboard and fiberboard are as roofing shakes, exterior siding, roof decking, and floor and wall sheathing. Cement-bonded particleboards and fiberboards are generally produced in thicknesses ranging from about 8 to about 40 mm.

Current production technology of cement-bonded particleboard and fiberboard is strongly influenced by the slow hydration process of inorganic binders and also by the sensitivity of this process to wood species. This technology, particular versions of which are introduced in U.S. Pat. Nos. 3,164,511 (Jan. 5, 1965) and 3,271,492 (Sep. 6, 1966) to Armin Elmendorf, involves blending of a relatively dry (with low moisture content) combination of a hydraulic cement (e.g. Portland cement), wood or plant particles/fibers and some complementary ingredients, spreading out and pressing the blend, heat treatment of the pressed blend for several hours until the inorganic binder develops sufficient strength and stiffness to withstand opening of the press without spring-back or collapse, and finally curing of the end product for several days in ambient conditions until the end product reaches the dimensional stability, strength and stiffness levels required for shipment. This production technology offers low productivity and lacks flexibility for producing diverse boards of different geometries. Due to the sensitivity of the hydration of cement to particular wood species, the industry now operates on an approved list of species and generally requires a minimum processing and seasoning of wood particles/fibers prior to use in the production process.

Our invention overcomes the problems with the slow process and species-sensitivity of the production technology of cement-bonded particleboard and fiberboard through injection of a carbon dioxide-enriched gas into the blend under press. Accelerated curing of cement-based binder with carbon dioxide gas has been subject of several patents.

Most patents on accelerated curing with carbon dioxide gas subject a pressed furnich cosisting mainly of a calcerous cementitious binder and aggregates, with relatively low moisturet content, to an environment enriched with carbond dioxide. U.S. Pat. No. 3,149,986 (Sep. 22, 1964) to N. Zelmanoff teaches that such relatively dry pressed products are best cured in a carbon dioxide-rich environment if the tempearature and relative humidity of the environment correspond to the equilibrium level of the product where the moisture content of the procut is stabilized. At lower temperatures and higher relative humidities, it would be advantageous to pre-dry the product in order to accelerate the curing process in the carbon dioxide-rich environment. U.S. Pat. No. 3,468,993 (Sep. 23, 1969) to K. G. Bicrlch teaches that pressing by repeated impact favors subsequent accelerated curing with carbon dioxide gas by uniformly distibuting moisutre in the product in the form of films in close contact with binder particles to promote early hydration reactions. This invention also suggests that a high pressure in the carbon dioxide-rich envieonment favors the accelerated curing process. U.S. Pat. No. 3,492,385 (Jan. 27, 1970) tto B. Simunic teaches that temperature cyling in the carbon dioxide-rich environment benefits the accelerated curing of the pressed products. U.S. Pat. Nos. 4,436,498 (Mar. 13, 1984) and 4,427,610 (Jan. 24, 1984) to J. A. Murray both teach that the use of ultracold carbon dioxide gas actually benefits the accelerated curing process. U.S. Pat. No. 5,257,464 (Nov. 2, 1993) to F. Trevino-Gonzales introduces a controlled multi-step process of curing the pressed products where the product undergoes early cooling, intermediate humidification and finally exposure to a carbon dioxide-rich environment follwed by heating with dry air to complete the curing process. British Patent No. 781,328 (Mar. 21, 1956) to D. H. Snelson teaches that the application of vacuum followed by the introduction of carbon dioxide gas in a sealed chamber leads to a more uniform and thorough curing of pressed products. U.S. Pat. No. 4,093,690 (Jun. 6, 1978) to J. A. Murray presents information on the preferred material and size of the chamber where exposure to carbon dioxide gas takes place.

U.S. Pat. No. 4,266,921 (May 12, 1981) to J. A. Murray exposes the blend of cacarous cementitious binder and aggregates with relatively low moisure content to carbon dioxide gas prior to and during pressing. U.S. Pat. No. 4,362,679 (Dec. 7, 1982) to R. Malinowski teaches that products made with conventional concrete at normal moisture content can be dewatered first under the effect of suction so that carbon dioxide can penetrate the product and accelerate its curing process. U.S. Pat. No. 2,496,895 (Feb. 7, 1950) to R. W. Staley introduces carbon dioxide gas into a high-pressure steam curing chamber for accelerated curing of products made with substantially non-acidic aggregates (fillers) and a calcarious cementitious binder with water. British Patent No. 1,460,284 (Dec. 31, 1976) to W. Lieber teaches that thin slurry-dewatered fibrous cement products undergo accelerated curing when exposed to carbon dioxide gas.

OBJECTS AND ADVANTAGES

Accordingly, several objects and advantages of my invention are to provide a method and an apparatus for accelerated processing of cement-bonded particleboard and fiberboard, to achieve a controlled, thorough and efficient acceleration of the curing process, to reduce the cost and raw material consumption in accelerated processing of cement-bonded particleboard and fiberboard, and to enhance the mechanical, physical and durability characteristics of the end products.

Still further objects and advantages will become apparent from a consideration of the ensuing description and accompanying drawings.

SUMMARY

Figure 1A:
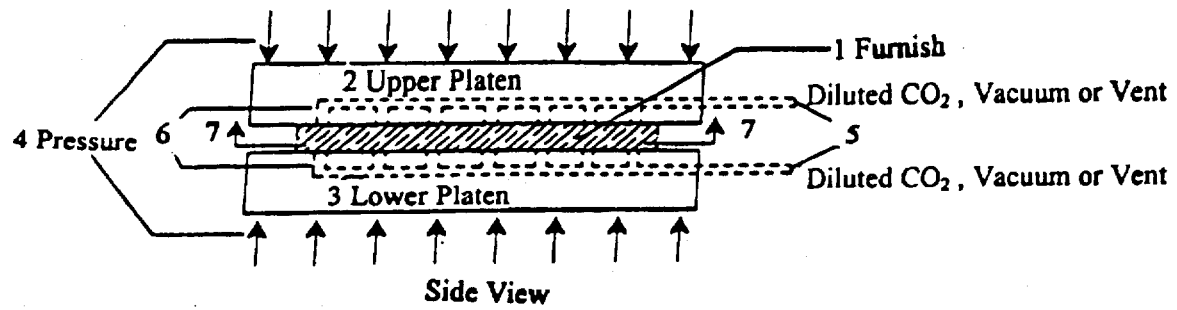
FIG. 1 is a perspective view of the press for the injection of diluted carbon dioxide gas; during or after press closure.

A method and an apparatus are provided for accelerated processing of cement-bonded particleboard and fiberboard through the injection of diluted carbon dioxide gas under compaction pressure. A controlled, thorough and efficient acceleration of the curing process is achieved, and the compaction pressure can be released after few minutes when the product is strong and stiff enough to resist spring-back and the handling stresses. This acceleration of the curing process, particularly when achieved using diluted carbon dioxide gas in lieu of pure carbon dioxide, yields an efficient and streamlined production process with high levels of productivity and cost-efficiency. The use of diluted carbon dioxide gas also enhances the efficiency in gas consumption and thus reduces the cost of raw materials. The process also broadens the raw materials basis for cement-bonded particleboard and fiberboard, and reduces the inhibiting effects of some wood particles on the production process. Cement-bonded particleboards and fiberboards produced using this process achieve higher early-age and ultimate levels of mechanical, physical and durability performance characteristics.

PREFERRED EMBODIMENT—DESCRIPTION

Cement-bonded particleboard and fiberboard to be processed by the method of this invention comprise a calcareous cementitious binder, wood or plant particles and/or fibers, moisture, and optionally various admixtures and aggregates which are commonly used in conventional practice. The calcareous cementitious binder may be Portland cement, Portland pozzolan cement, Portland slag cement, or blast furnace slag. Wood particles and fibers may cover wide ranges of size and geometric configuration. Wood particles typically range from about 1 to about 1000 mm in length, about 0.1 to about 10 mm in width, and about 0.01 to about 1 mm in thickness. Wood or plant fibers range from about 0.005 to about 5 mm in effective cross-sectional diameter and about 0.5 to about 100 mm in length; wood or plant fibers may also be replaced with glass or synthetic fibers in the product. The wood or plant particles or fibers used in the process may be untreated or may have been seasoned or treated; recycled wood particles or fibers may also be used in the process. The mix proportions of cement-bonded particleboard and fiberboard fall in the following ranges: about 0.01 to about 2 particle or fiber/binder ratio, and about 0.05 to about 2 water/binder ratio. The optional ingredients to be added to the furnish include lime as a promoter of the carbonation reactions (at about 0.01 to about 0.5 lime/binder ratio), accelrators (e.g. calcium chloride or aluminum sulfate), sodium silicate to reduce the inhibiting effects of wood extractives, light-weight aggregates to reduce the density of the end product, and normal-weight aggregates to enhance the dimensional stability of the product. In case blast furnace slag is used as the binder, it may be activated by the addition of sodium hydroxide, calcium chloride, or other activators.

The hydration of cement in the furnish described above primarily involves the reaction of calcium silicates with water to produce calcium silicate hydrate and calcium hydroxide. This process is, however, slow, requires few weeks for substantial progress, and can be slowed down by wood extractives and hydrolyzable hemicellulose. When carbon dioxide is introduced into the furnish, it dissolves in water to form carbonic acid which promotes a vigorous reaction of calcium silicates in few minutes, yielding calcium silicate hydrate, calcium carbonate and water. Subsequently, carbonation of the calcium silicate hydrate takes place. This whole carbonation process reacts as much calcium silicates in few minutes as the conventional hydration of cement does in few weeks; the end products of the process are also chemically and dimensionally more stable. Furthermore, this process of accelerated curing with carbon dioxide reduces the inhibiting effects of wood extractives and hydrolyzable hemicellulose.

Figure 1B:
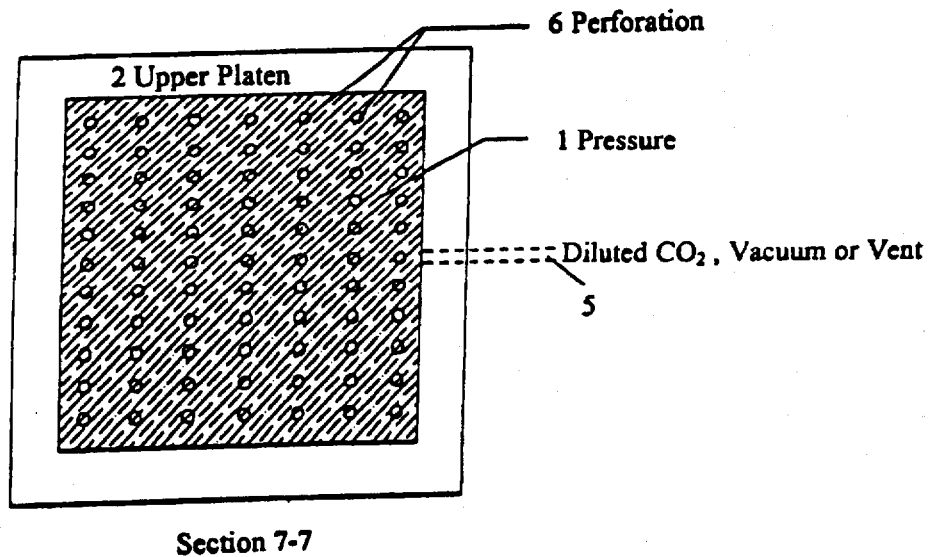

In order to introduce the carbon dioxide gas into the furnish and promote a thorough, controlled and efficient accelerated curing of the furnish, we use the carbon dioxide injection press shown in FIG. 1. The furnish (1) is spread between the upper platen (2) and the lower platen (3) of the press. The upper and lower platens (or optionally one of them) are equipped with conduits (5) and perforations (6) for the application of diluted carbon dioxide, vacuum or ventilation to the top and bottom surfaces of the furnish (or optionally to one surface of the furnish). The platens may be made of metal, synthetic materials, composites, inorganic materials, or wood. The application of vacuum is an option and the press may have the ability of applying only diluted carbon dioxide on the top and bottom surfaces of the furnish (or optionally on one of these surfaces). The diluted carbon dioxide gas may have 0% to 100% relative humidity, about 1% to about 100% carbon dioxide concentration, about 0% to about 99% concentration of an inert gas (e.g. air), and a pressure ranging from atmospheric pressure to about 5000 KPa. The carbon dioxide may be obtained from any solid, liquid or gas source, and its temperature during application may range from about −100 degrees C. to about +100 degrees C. The carbonation reactions are highly exothermic and may induce differential thermal and moisture movements which are detrimental to board properties. The rapid rate of reactions could also rapidly harden the surface and prevent thorough gas permeation. Hence, in order to achieve a controlled, thorough and efficient acceleration of the board curing process, it is advantageous to use a diluted carbon dioxide gas in lieu of pure or substantially pure carbon dioxide.

PREFERRED EMBODIMENT—OPERATION

Operation of the apparatus of the present invention will be described further with reference to FIG. 1.

The furnish (1) is spread between the lower platen (3) and upper platen (2) of the press. Sufficient amount of the furnish should be provided to produce the desired thickness and specific gravity. Typical thicknesses range from about 2 mm to about 40 mm, and typical specific gravities from about 0.2 to about 2.5. The press is then closed and pressure (4) applied in order to compact the board to the desired thickness.

Subsequently, or optionally starting as the press in being closed, the top and bottom surfaces, or optionally one of them, is subjected to different sequences of vacuum, diluted carbon dioxide gas and ventilation application. Only the applicaiton of diluted carbon dioxide under pressures ranging from atmospheric pressure to about 5000 KPa is essential; vacuum application and ventilation are optional. The diluted carbon dioxide gas may comprise about 1% to about 100% carbon dioxide and about 0% to about 99% an inert gas (e.g. air), and its relative humidity may range from 0% to 100%. The carbon dioxide may be obtained from different solid, liquid or gas sources, and its temperature during application may range from about −100 degrees C. to about +100 degrees C. The preferred gas application pressure increases as the board specific gravity and thickness increase. In order to achieve a controlled, thorough and efficient accelration of the process through carbonation reactions, it is advantageous to use a diluted carbon dioxide gas in lieu of a substantually pure carbon dioxide gas. The application of vacuum prior to the injection of diluted carbon dioxide gas benefits the process by facilitating thorough gas permeation. The application of vacuum after injection of the diluted carbon dioxide gas also benefits the process by reducing the pressure inside board prior to the opening of the press. The whole process of accelerated curing of the board under press may last from about 0.5 minute to about 30 minutes. The press can then be opened because the board would have gained sufficient strength and stiffness to resist spring-back and to withstand the stresses applied during handling, cutting to size and surface finishing. Such accelerated cured boards would substantially gain their ultimate properties after few days in ambient conditions.

OTHER EMBODIMENTS

Utilization of Combustion Emissions—Description

Combustion emissions which typically contain a concentration of carbon dioxide may provide the source of diluted carbon dioxide. Combustion emissions may be used without any pretreatment; alternatively, their temperature, relative humidity and/or concentration of various gases (including carbon dioxide) may be adjusted to better suit the process.

Utilization of Combustion Emissions—Operation

When combustion emissions, treated or untreated, are used as the source of diluted carbon dioxide gas, the opertion would not require any substantial adjustment and can be performed as described in the main embodiment.

Modification of Existing Press Systems—Description

While the press system shown in FIG. 1 may be specifically produced for accelerated curing of cement-bonded particleboard and fiberboard, and alternative is to modify an existing press system by the addition of a perforated plate (6) with the conduits (5) for the application of diluted carbon dioxide gas, vacuum and ventilation to the existing platns which are typically solid.

Modification of Existing Press Systems—Operation

The use of press systems produced by the modification of existing conventional press systems does not constitute any change in the operation of the system; the operation process described in the main embodiment would still be applicable.

CONCLUSIONS, RAMIFICATIONS, AND SCOPE

Accordingly, it can be seen that, according to the invention, I have provided a method and an apparatus for thorough, efficient and controlled accelerated curing of cement-bonded particleboard and fiberboard, and also for reducing the processing cost and raw material consumption, broadening the selection of suitable raw materials, and enhancing the mechanical, physical and durability characteristics of cement-bonded particleboard and fiberboard.

Although the description above contains many specificities, these should not be construed as limiting the scope of the invention but as merely providing illustrations of some of the presently preferred embodiments of this invention. Various other embodiments and ramifications are possible within it's scope. For example, the injection press system may be produced by modifying the existing conventional press systems, and combustion emissions may be used as the source of diluted carbon dioxide in the process.

Thus the scope of the invention should be determined by the appended claims and their legal equivalents, rather than by the examples given.

EXAMPLE 1

Aspen was cut into logs and deparked. Chips made from these logs were stored for two weeks and then hammermilled into particles with average length of 6.87 mm, width of 0.89 mm, and thickness of 0.5 mm. The particles were soaked in water for 24 hours, dried, and stored for 3 more weeks prior to use for the production of particleboard, when they had a moisture content of 5%. Type I Portalnd cement with lime at 90% cement to 10% lime weight ratio were used as binder. The wood (ovendry)/binder weight ratio in the furnish was 0.3, and the water/binder weight ratio was 0.25. The furnish was blended in a conventional mortar mixer. This relatively dry mix was spread onto a screen and transferred to a gas injection press. We targeted a specific gravity of 1.2 and a thickness of 13 mm. The press was then closed to the targeted thickness over a period of 30 seconds, and the furnish was subjected to a sequence of vacuum and diluted carbon dioxide application, with the diluted carbon dioxide comprising either 15% or 100% concentration of carbon dioxide. The 15% concentration was obtained by blending carbon dioxide with air (using air at its natural relative humidity of about 50%). The sequence used in this example was as follows: (1) vacuum on top face for 20 seconds; (2) diluted carbon dioxide on top face and vacuum on bottom face for 40 seconds; (3) vacuum on bottom face for 20 seconds; (4) diluted carbon dioxide on bottom face and vacuum on top face for 40 seconds; (5) vacuum on both faces for 20 seconds; (6) carbon dioxide on both faces for 60 seconds; (7) closing of valves on both faces for 30 seconds; (8) ventilation for 3 seconds; and (9) vacuum on both faces for 30 seconds. The press was subsequently opened over a period of 30 seconds. The boards produced by this process showed excellent resistance against spring-back upon removal from press and could resist handling stresses. The boards produced with 15% and 100% carbon dioxide concentrations showed comparable flexural strengths exceeding 4 MPa immediately upon release from the press. This level of flexural strength was close to 50% of the ultimate level of strength reached after less than 14 days in ambient conditions. The boards cured with carbon dioxide gas (pure or diluted) provided higher levels of ultimate strength, stiffness, water-tightness, dimensional stability and durability when compared with comparable boards subjected to conventional (slow) curing processes. Furthermore, the board subjected to accelerated curing with diluted (15% concentration) carbon dioxide performed similar to that processed with pure carbon dioxide in spite of the fact that the consumption of carbon dioxide was substantially less (about 80% less) when useing the diluted carbon dioxide. A more thorough carbonation reaction was also observed across the depth of the board with diluted carbon dioxide. This confirms our hypothesis that the use of diluted carbon dioxide in our invention (in lieu of pure carbon dioxide) raises the efficiency and thoroughness of the process.

What is claimed is:

1. A method of accelerated curing of cement-bonded particleboard and fiberboard where the furnish comprises natural or synthetic particles and fibers, a calcareous cementitious binder, moisture and, optionally, concrete additives and aggregates;

natural or synthetic particles are about 1–1000 mm in length, about 0.1–10 mm in width and about 0.01–1 mm in thickness, and natural or synthetic fibers are about 0.005–5 mm in equivalent cross-sectional diameter and about 0.5–100 mm in length; these particles and fibers may be obtained from virgin or recycled sources;

the calcareous cementitious binder is at least one of Portland cement, Portland pozzolan cement, Portland slag cement, coal fly ash and ground granulated blast furnace slag;

the optional aggregates comprise at least one of lightweight and normal-weight aggregates of mineral or synthetic sources;

the particle or fiber-to-binder ratio in the furnish ranges from about 0.01 to about 2.0 by weight, and the water-to-binder ratio ranges from about 0.05 to about 2.0 by weight; if lime is used, it is added at about 0.01 to about 0.5 lime-to-binder weight ratio;

the furnish is blended, compacted under pressure to about 2–40 mm thickness and about 0.2–2.5 g/cm$^3$ density, and at least one of the top and bottom faces of the furnish are subjected to diluted carbon dioxide gas injection and ventilation in order to accelerate the curing process of the calcareous cementitious binder and produce sufficient strength and stiffness in about 0.5–30 minutes to resist spring-back upon release of the compaction pressure and to tolerate subsequent handling and processing stresses; the diluted carbon dioxide comprises about 1%–50% carbon dioxide gas and about 50%–99% inert gases or air, and its relative humidity ranges from 0% to 100% and its temperature from −100° C. to 200° C.; the application pressure of the diluted carbon dioxide gas ranges from the atmospheric pressure to about 5000 KPa.

2. The method of claim 1 where the furnish also includes at least one of sodium hydroxide, sodium silicate, set accelerating concrete admixture and air-entraining concrete admixture.

3. The method of claim 1 where vacuum is applied on one face while carbon dioxide gas is applied on opposite faces of the compacted furnish.

4. The method of claim 1 where the application of carbon dioxide gas on a face of the furnish is preceded with the application of vacuum on the same face.

5. The method of claim 1 where the diluted carbon dioxide gas is injected into the furnish after the application of the compaction pressure.

6. The method of claim 1 where injection of the diluted carbon dioxide gas into the furnish starts during the application of the compaction pressure.

* * * * *